US012714898B2

(12) United States Patent
Yang et al.

(10) Patent No.: US 12,714,898 B2
(45) Date of Patent: Aug. 25, 2026

(54) FIREFIGHTING MOTOR AND FIRE EXTINGUISHING DEVICE

(71) Applicant: ZHEJIANG YUAN FIRE FIGHTING EQUIPMENT CO., LTD., Quzhou (CN)

(72) Inventors: Guojian Yang, Quzhou (CN); Zhenyu Yang, Quzhou (CN)

(73) Assignee: ZHEJIANG YUAN FIRE FIGHTING EQUIPMENT CO., LTD., Quzhou (CN)

( * ) Notice: Subject to any disclaimer, the term of this patent is extended or adjusted under 35 U.S.C. 154(b) by 0 days.

(21) Appl. No.: 19/463,910

(22) Filed: Jan. 29, 2026

(65) Prior Publication Data

US 2026/0158313 A1 Jun. 11, 2026

Related U.S. Application Data

(63) Continuation of application No. PCT/CN2025/116875, filed on Aug. 26, 2025.

(30) Foreign Application Priority Data

| | | |
|---|---|---|
| Aug. 7, 2024 | (CN) | 202411078956.3 |
| Dec. 31, 2024 | (CN) | 202411993470.2 |
| Aug. 6, 2025 | (CN) | 202511095008.5 |
| Aug. 6, 2025 | (CN) | 202521661147.5 |

(51) Int. Cl.

| | |
|---|---|
| ***A62C 35/68*** | (2006.01) |
| ***A62C 31/00*** | (2006.01) |
| ***A62C 37/08*** | (2006.01) |
| ***A62C 99/00*** | (2010.01) |

(52) U.S. Cl.
CPC ............ *A62C 35/68* (2013.01); *A62C 31/005* (2013.01); *A62C 37/08* (2013.01); *A62C 99/0072* (2013.01)

(58) Field of Classification Search
CPC ....... A62C 35/68; A62C 31/005; A62C 37/08; A62C 37/09; A62C 99/0072
See application file for complete search history.

(56) References Cited

U.S. PATENT DOCUMENTS

| | | | | |
|---|---|---|---|---|
| 2019/0091500 A1* | 3/2019 | Jimenez | ................ | A62C 35/62 |
| 2021/0299493 A1 | 9/2021 | Yanshan | | |

FOREIGN PATENT DOCUMENTS

| | | |
|---|---|---|
| CN | 103842650 A | 6/2014 |
| CN | 205850065 U | 1/2017 |
| CN | 106621143 A | 5/2017 |

(Continued)

OTHER PUBLICATIONS

International Search Report and Written Opinion issued in International Application No. PCT/CN2025/116875 dated Oct. 21, 2025 (19 pages).

*Primary Examiner* — Steven M Sutherland
(74) *Attorney, Agent, or Firm* — Osha Bergman Watanabe & Burton LLP

(57) ABSTRACT

A firefighting motor and a fire extinguishing device comprising the same are disclosed. The firefighting motor includes a stator, a rotor disposed outside the stator and rotating around the stator, and a coil winding disposed on the stator or the rotor, where a medium channel for a fire extinguishing medium to flow through is provided in the stator, and the medium channel runs through the stator.

10 Claims, 7 Drawing Sheets

(56) References Cited

FOREIGN PATENT DOCUMENTS

| | | | | | |
|---|---|---|---|---|---|
| CN | 106921261 | A | | 7/2017 | |
| CN | 110048551 | A | | 7/2019 | |
| CN | 211201674 | U | * | 8/2020 | |
| CN | 212327272 | U | | 1/2021 | |
| CN | 116349123 | A | * | 6/2023 | ............. H02K 16/04 |
| CN | 119656526 | A | | 3/2025 | |
| CN | 120571194 | A | | 9/2025 | |
| RU | 2093665 | C1 | | 10/1997 | |

* cited by examiner

FIREFIGHTING MOTOR AND FIRE EXTINGUISHING DEVICE

CROSS-REFERENCE TO RELATED APPLICATIONS

This application is a continuation of International Application No. PCT/CN 2025/116875 filed on Aug. 26, 2025, which claims priority to Chinese Patent Application No. 202411993470.2, filed on Dec. 31, 2024, Chinese Patent Application No. 202411078956.3, filed on Aug. 7, 2024, Chinese Patent Application No., 202521661147.5, filed On Aug. 6, 2025, and Chinese Patent Application No., 202511095008.5, filed On Aug. 6, 2025, the entire contents of which are incorporated herein by reference.

TECHNICAL FIELD

This disclosure relates to the technical field of firefighting equipment and, in particular, to a firefighting motor and a fire extinguishing device.

BACKGROUND

The core of fire prevention and control lies in preventing problems before they occur, and when a fire breaks out, the fire source must be extinguished efficiently and fast at the earliest moment to reduce casualties and property damage as much as possible. Currently, firefighting regulations clearly stipulate that densely populated buildings must be equipped with additional firefighting facilities, and especially in crowded places, automatic fire sprinkler systems must be installed.

In the prior art, automatic fire sprinkler systems, after a fire occurs, generally adopt a passive fire extinguishing water spraying method, that is, water is automatically sprayed to extinguish the fire after the fire occurs, but this method has problems such as:

1. Delayed response: The sprinkler head needs to reach a specific temperature (usually above 68° C.) to activate, resulting in an inability to respond in a timely manner in the early stage of the fire and missing the best extinguishing opportunity.
2. Limited coverage: The sprinkler water curtain is unevenly distributed, making it difficult to precisely cover the fire source and resulting in low extinguishing efficiency.

Therefore, there is a need to provide a fire extinguishing device that can overcome the defects of passive fire extinguishing water spraying devices, improve the extinguishing performance of firefighting facilities, and reduce casualties and property losses, where the supporting firefighting motor used therewith is particularly important.

SUMMARY

A purpose of this disclosure is to provide a firefighting motor and a fire extinguishing device to solve the defects of passive fire extinguishing water spraying devices.

To achieve the above purpose, this disclosure provides a firefighting motor including a stator, a rotor disposed outside the stator and configured to rotate around the stator, and a coil winding disposed on the stator or the rotor. A medium channel for a fire extinguishing medium to flow through is provided in the stator, and the medium channel extends through the stator. A flow direction of the fire extinguishing medium in the medium channel is perpendicular to a plane formed by a rotation trajectory of the rotor.

In this disclosure, the stator is used as an axle for the rotor. The rotor is disposed outside the stator. The medium channel is disposed in the stator. As such, the medium channel does not move regardless of the rotation of the rotor, ensuring that the fire extinguishing medium can flow normally in the medium channel.

In one or more embodiments, end covers movably connected to the stator are installed at two ends of the rotor. A braking device is installed on at least one end cover.

This disclosure provides the braking device to brake the rotation of the rotor, preventing movement of a sprinkler connected to the stator, effectively fixing a spraying direction, and ensuring the spraying effect.

In one or more embodiments, the braking device is an electromagnetic braking device. A control circuit board electrically connected to the braking device is installed on the stator. The electromagnetic braking device is connected to an external power supply through wires. The control circuit board can control the connection/disconnection between the electromagnetic braking device and the external power supply.

This disclosure provides the control circuit board to control the connection/disconnection of a circuit of the electromagnetic braking device, thereby controlling the connection/disconnection of the circuit of the electromagnetic braking device, controlling the braking device to fix the rotor, and preventing arbitrary movement of the rotor.

In one or more embodiments, the braking device includes a brake base installed on the end cover, an electromagnet installed on the brake base, a moving part movably installed on the brake base and corresponding to the electromagnet, a friction block installed on the moving part for frictional contact with the stator, a reset member installed in abutment between the brake base and the moving part, and a limiting structure provided on the moving part and the brake base.

This disclosure provides the brake base to offer installation conditions for the electromagnet, the moving part, and the reset member, such that the braking device can be installed on the end cover. With the provision of the electromagnet, the electromagnet is connected to the control circuit board through wires, allowing the control circuit board to control the connection/disconnection between the electromagnet and the external power supply, and to control a magnetic field of the electromagnet, thereby controlling contact between the friction block and the rotor. The reset member is provided to control separation of the friction block from the rotor. The limiting structure is provided to restrict the movement of the moving part and avoid excessively resetting the moving part.

In one or more embodiments, the brake base is provided with a central through hole corresponding to the stator. A diameter of the central through hole is larger than an outer diameter of the stator.

This disclosure provides the central through hole to prevent interference between the brake base and the stator.

In one or more embodiments, the moving part includes a moving plate and a moving sleeve provided on the moving plate and located in the central through hole. An inner diameter of the moving sleeve is not smaller than the outer diameter of the stator.

This disclosure provides the moving plate and the moving sleeve for abutment against the reset member, enabling the reset member to push the moving part to move and thereby drive the friction block to move and reset. Making the inner diameter of the moving sleeve not smaller than the outer diameter of the stator ensures that the moving part does not interfere with the stator.

In one or more embodiments, the friction block is installed on the moving sleeve and located between the end cover and the brake base.

In this disclosure, the friction block is positioned between the end cover and the brake base, so that the friction block can move to come into contact with or separate from the end cover.

In one or more embodiments, a rotation limiting structure is provided on the rotor and the motor and configured to prevent excessive rotation of the rotor, such that the rotor performs reciprocating rotation around the stator and can only rotate 360 degrees in each direction.

This disclosure provides the rotation limiting structure to limit a rotation angle, ensuring that the rotor does not rotate excessively.

In one or more embodiments, the rotation limiting structure includes a limiting protrusion provided on the stator and a mating protrusion provided on the rotor and corresponding to the limiting protrusion.

This disclosure provides the limiting protrusion and the mating protrusion to limit the rotation angle of the rotor, ensuring that the rotor can only perform 360° reciprocating rotation.

In one or more embodiments, the rotation limiting structure further includes two proximity switches symmetrically distributed with respect to a connection line between a center of the stator and the limiting protrusion. During rotation of the rotor, the proximity switches sense passage of the mating protrusion.

This disclosure provides the proximity switches to emit a signal before the rotor rotates to a limit position, providing sufficient time for activation of the braking device and reducing impact of a direct hard collision between the limiting protrusion and the mating protrusion on rotation of the rotor.

In one or more embodiments, the limiting structure includes a counterbore provided in the moving plate and a bolt installed in the counterbore and connected to the friction block.

This disclosure provides the counterbore to hide a bolt head and prevent the bolt head from affecting the stator.

In one or more embodiments, the brake base is further provided with a first annular groove and a second annular groove. Both the second annular groove and the first annular groove are concentric with the central through hole. A diameter of the first annular groove is smaller than a diameter of the second annular groove.

This disclosure provides the first annular groove and the second annular groove to offer installation spaces for the reset member and the electromagnet. The concentric configuration with respect to the central through hole ensures uniform force distribution by the electromagnet and the reset member on the moving part, avoiding jamming due to uneven force.

In one or more embodiments, the reset member is a spring, having one end in contact with a groove bottom of the first annular groove and another end abutting against the moving plate. The electromagnet is installed in the second annular groove. The moving plate is made of a magnetic material, and remaining portions of the braking device are made of non-magnetic materials.

In this disclosure, the spring is used as an elastic member to effectively push the moving part to perform resetting movement, thereby driving the friction block to move synchronously and separating the friction block from the rotor. The moving plate is made of the magnetic material, ensuring that the moving plate can be controlled by magnetic attraction to the electromagnet.

In one or more embodiments, a moving part movably connected to the stator is installed on the end cover.

In one or more embodiments, the moving part may be a axle sleeve or a bearing.

This disclosure provides the moving part to reduce friction between the rotor and the stator during rotation.

This disclosure further discloses a fire extinguishing device including a junction box, a sprinkler configured to rotate synchronously with the rotor, a firefighting motor, a medium pipe provided on the stator of the firefighting motor, and a connection head movably connected to the stator provided on the sprinkler.

This disclosure provides the sprinkler to spray the fire extinguishing medium for firefighting operations. The medium pipe connects the medium channel to an external water source. The fire extinguishing medium may be tap water. A pressurization device, such as a booster pump, may be added at the water source to pressurize the fire extinguishing medium. A manual valve is designed at a water supply pipe end for closing the water source during device maintenance.

In one or more embodiments, the fire extinguishing device further includes a pivoting mechanism installed on the motor. A central controller is installed in the junction box. A solenoid valve connected to the central controller is installed on the medium pipe.

This disclosure provides the pivoting mechanism to enable adjustment of a spraying angle of the sprinkler. The central controller controls the pivoting mechanism and the solenoid valve to control the spraying or pivoting angle of the sprinkler and the flow rate of the fire extinguishing medium.

In one or more embodiments, when the rotor drives the sprinkler to rotate, a trajectory of the sprinkler forms a first plane, and when the pivoting mechanism drives the sprinkler to rotate, a trajectory of the sprinkler forms a second plane, the second plane being perpendicular to the first plane.

This disclosure provides perpendicular planes formed by the two rotation trajectories to increase a range in which the fire extinguishing medium can be sprayed. Specifically, when the rotor drives the sprinkler to rotate, the sprinkler faces different directions. The pivoting mechanism adjusts an angle formed by the sprinkler with the ground, adjusting the distance of spraying the fire extinguishing medium by the sprinkler, thereby expanding the spraying range of the sprinkler and enlarging the extinguishing range of the fire extinguishing device.

In one or more embodiments, the pivoting mechanism includes a support frame installed on the rotor, an adjustment power source installed on the support frame, a transmission mechanism connected to the adjustment power source and the sprinkler, and a connecting piece movably connected to the stator and the sprinkler.

In this disclosure, the support frame provides installation positions for other components of the pivoting mechanism, enabling the pivoting mechanism and the sprinkler to move synchronously with the rotor. The adjustment power source provides power for up-down pivoting of the sprinkler and adjustment of a spraying angle between the sprinkler and the ground. The adjustment power source may be a motor. The transmission mechanism transmits power output from the adjustment power source. The connecting piece conveys the fire extinguishing medium in the medium channel to the sprinkler.

In one or more embodiments, a protective cover is installed on the support frame. A spray hole is provided in the protective cover. A blocking piece corresponding to the spray hole is installed on the sprinkler. When the sprinkler undergoes up-and-down adjustment, the blocking piece is driven to pivot synchronously.

This disclosure provides the protective cover to protect the sprinkler and the motor, preventing direct impact by a user on the motor and the sprinkler and avoiding damage to the sprinkler and the motor due to impact. The spray hole aligns with the sprinkler, ensuring that the fire extinguishing medium is not blocked by the protective cover and the fire extinguishing medium can be smoothly sprayed to extinguish a fire. The blocking piece corresponds to the spray hole, blocking the spray hole when a firefighting operation is not required, thereby enhancing protection of the motor and the sprinkler. Synchronous pivoting of the sprinkler and the blocking piece enables the sprinkler, during pivoting, to drive the blocking piece to move synchronously, allowing the blocking piece to move away from the spray hole while the sprinkler sprays the fire extinguishing medium through the spray hole.

In one or more embodiments, the blocking piece includes a connection plate fixedly installed on the sprinkler and an arc-shaped baffle installed on the connection plate. The arc-shaped baffle corresponds to the spray hole.

This disclosure provides the connection plate to drive the arc-shaped baffle to move synchronously with the sprinkler.

In one or more embodiments, an orthographic projection of the sprinkler on the second plane and an orthographic projection of the connection plate on the second plane form an included angle with an opening facing the arc-shaped baffle. When the sprinkler rotates to any angle, the orthographic projection of the sprinkler on the second plane does not coincide with the orthographic projection of the connection plate on the second plane.

In this disclosure, an included angle is formed between the sprinkler and the connection plate so that a movement trajectory of the fire extinguishing medium out of the sprinkler is not blocked by the arc-shaped baffle.

In one or more embodiments, a fixing piece is installed on the stator. A fixing bracket is installed on a top of the fixing piece.

This disclosure provides the fixing bracket and the fixing piece to fixedly install the fire extinguishing device at an appropriate position. Alternatively, the stator is threadedly fixed to a water pipe to fixedly install the fire extinguishing device at an appropriate position.

In one or more embodiments, a sensor and an alarm are installed at a bottom of the protective cover. The sensor and the alarm are connected to the central controller.

In this disclosure, the sensor adopts an infrared or ultraviolet composite detection method. When a fire occurs in a protected region, the sensor captures fire information at the first moment and transmits it to each fire extinguishing action mechanism, and the fire extinguishing device starts to work.

In one or more embodiments, the fire extinguishing device is further provided with a self-test signal loop connected to a console via signals for fault self-detection of the fire extinguisher.

In this disclosure, a self-test module includes a fault acousto-optic warning module. Signal connection between the self-test module and the console enables a status self-test of a host of the fire extinguishing device. When a fault is detected, the fire extinguishing device flashes a fault warning light to remind a user to repair it promptly through a fault reminder function. Upon a device fault, a fault signal is transmitted to a fire alarm console via the central controller. The console has PC and APP display designs with data synchronization. During debugging and repair, settings and operations can be performed through a device USB interface or an APP interface.

This disclosure provides a firefighting motor and a fire extinguishing device, which have multiple beneficial effects.

According to the firefighting motor and the fire extinguishing device thereof, the stator is disposed at a central position, and the medium channel for the fire extinguishing medium to flow through is disposed in the stator, ensuring that rotation of the rotor does not interfere with conveyance of the fire extinguishing medium. This achieves an innovative upgrade of the conventional fixed burst-type fire sprinkler, enables more precise fire extinguishing, enhances intelligence of the fire extinguishing device, reduces risks of fire spread, and greatly improves fire prevention and extinguishing capability in protected regions through disclosure of this technology.

Figure 1:
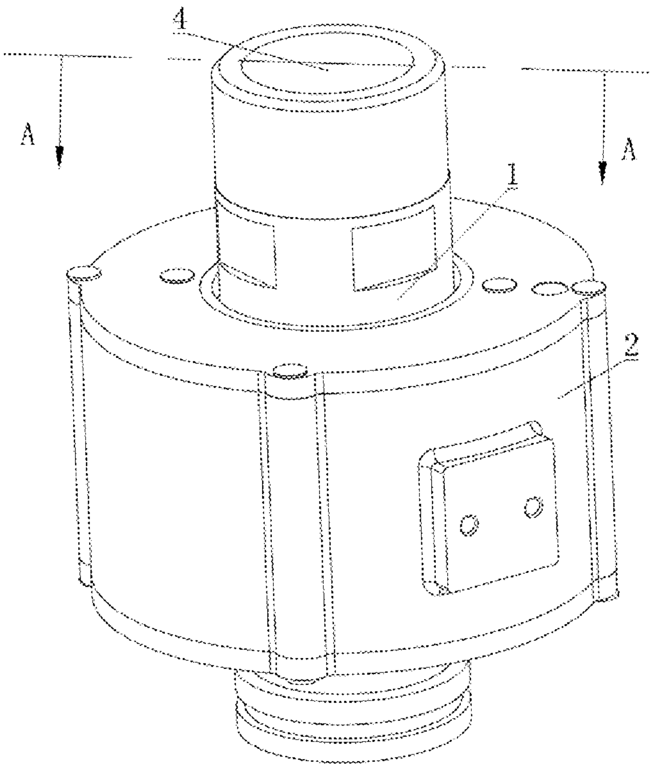
FIG. 1 is a schematic diagram of an overall structure of a firefighting motor according to one or more embodiments of this disclosure.

Reference numerals in the figures: 1. stator; 11. medium pipe; 12. solenoid valve; 13. fixing piece; 131. sensing unit; 14. fixing bracket; 15. manual valve; 2. rotor; 21. end cover; 22. moving part; 23. rotation limiting structure; 231. limiting protrusion; 232. mating protrusion; 233. proximity switch; 3. coil winding; 4. medium channel; 41. sprinkler; 411. nozzle; 412. hose; 413. rotating shaft; 413*a*. first rotating shaft; 413*b*. second rotating shaft; 414. shaft coupling; 5. braking device; 51. brake base; 511. central through hole; 512. first annular groove; 513. second annular groove; 52. electromagnet; 53. moving part; 531. moving plate; 532. moving sleeve; 54. friction block; 55. reset member; 56. limiting structure; 561. counterbore; 562. bolt; 6. control circuit board; 7. junction box; 71. central controller; 72. power cable; 8. pivoting mechanism; 80. support frame; 801. protective cover; 802. spray hole; 803. blocking piece; 8031. connection plate; 8032. arc-shaped baffle; 8033. inclined surface; 804. sensor; 81. adjustment power source; 82. transmission mechanism; 83. connecting piece; 831. connector; 832. elastic component; 833. movable sleeve; 834. limiting groove; 835. first limiting protrusion; 836. second limiting protrusion; 837. end inclined surface; 838. radially inward protrusion; 84. movable connection structure; 841. outer annular groove; 842. inner annular groove; 843. steel ball; and 844. rubber sealing ring.

DETAILED DESCRIPTION

The following provides a detailed description with reference to the accompanying drawings and specific embodiments. Numerous specific details are set forth in the following description to facilitate a full understanding of this disclosure. However, this disclosure can be implemented in many other ways different from those described herein, and those skilled in the art can make similar changes without departing from the principle of this disclosure. Therefore, this disclosure is not limited by the specific embodiments disclosed below.

A firefighting motor of this disclosure can be applied to occasions such as firefighting and fire extinguishment, and certainly can also be used in other similar scenarios. The firefighting motor is described in detail below.

Referring to FIGS. 1 to 5, schematic structural diagrams of a firefighting motor according to one or more embodiments of this disclosure are shown. The firefighting motor includes a stator 1, a rotor 2 disposed around the stator 1 and rotating horizontally around the stator, a coil winding 3 disposed on the stator 1, where a medium channel 4 for a fire extinguishing medium to flow through is provided in the stator 1, and the medium channel 4 runs through the stator 1. A flow direction of the fire extinguishing medium in the medium channel 4 is perpendicular to a plane formed by a rotation trajectory of the rotor 2.

In this disclosure, the rotor 2 is disposed outside the stator 1, with the rotor 2 rotating around the stator 1. The rotor 2 is provided with permanent magnets or electromagnets opposite to the coil winding 3 for excitation. Certainly, the coil winding 3 can also be disposed on the rotor 2, in which case permanent magnets or electromagnets for excitation are disposed on the stator 1. The medium channel 4 is provided for the flow of the fire extinguishing medium, and the fire extinguishing medium can be, as one example, tap water. As the medium channel 4 is disposed on the stator 1, when the motor operates and the rotor 2 rotates, the medium channel 4 does not move, ensuring that the fire extinguishing medium can flow in the medium channel 4. That the flow direction of the fire extinguishing medium in the medium channel 4 is configured to be perpendicular to the plane formed by the rotation trajectory of the rotor ensures that an inlet end for the fire extinguishing medium to enter the medium channel 4 and an outlet end for the fire extinguishing medium to leave the medium channel 4 are respectively located at a top end and a bottom end of the stator 1, ensuring that rotation of the rotor 2 does not affect entry of the fire extinguishing medium into the medium channel 4 or exit from the medium channel 4.

Figure 2:
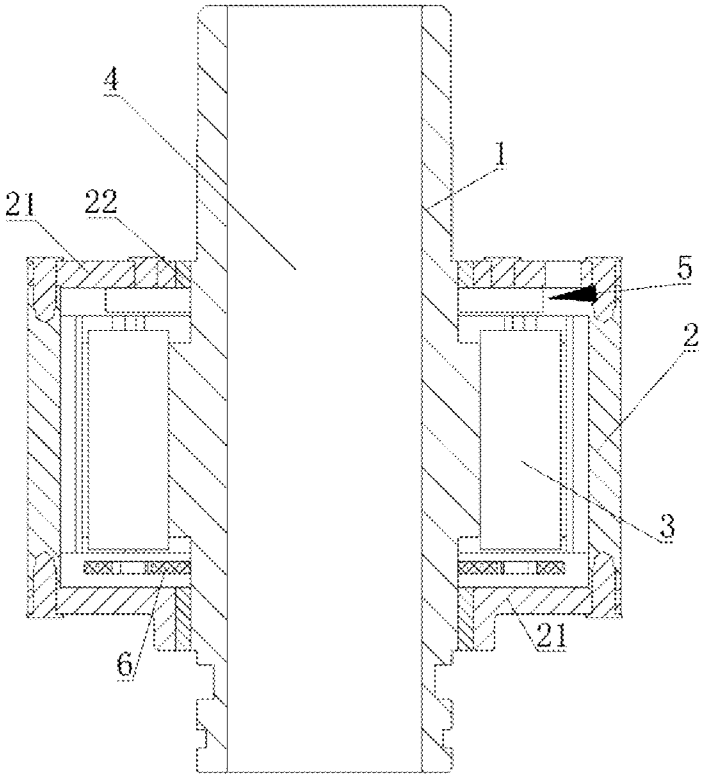
FIG. 2 is a cross-sectional view of a motor taken along A-A in FIG. 1.
Figure 3:
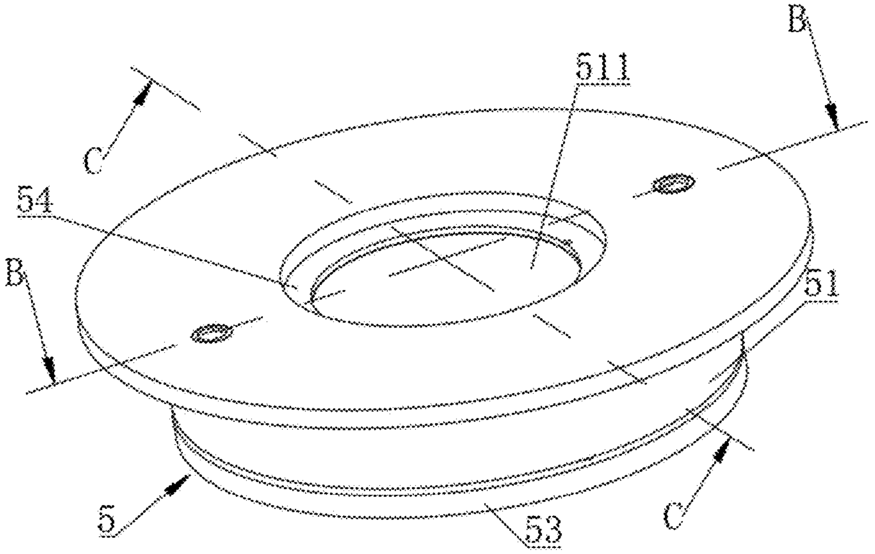
FIG. 3 is a schematic structural diagram of a braking device according to one or more embodiments of this disclosure.

Referring to FIGS. 1 to 3, in one or more embodiments of this disclosure, end covers 21 movably connected to the stator 2 are installed at ends of the rotor 2, a braking device 5 is installed on at least one end cover 21, a control circuit board 6 electrically connected to the braking device 4 is installed on the stator 1, and the control circuit board 6 can control the operation of the braking device 5.

The end covers 21 are configured to limit both ends of the rotor 2 and ensure that the rotor 2 does not separate from the stator 1. The braking device 5 is configured to stop the rotation of the rotor 2, avoids over-rotation of the rotor 2 due to inertia of the rotor 2, and ensures accuracy of a rotation angle. The braking device 5 can be an electromagnetic braking device as one example. The control circuit board 6 controls the connection/disconnection of the coil winding 3 and the connection/disconnection of the braking device 5.

Referring to FIGS. 2 to 5, in one or more embodiments of this disclosure, the braking device 5 includes a brake base 51 installed on the end cover 21, an electromagnet 52 installed on the brake base 51, a moving part 53 movably installed on the brake base 51 and corresponding to the electromagnet 52, a friction block 54 installed on the moving part 53 for frictional contact with the stator 1, a reset member 55 installed in abutment between the brake base 51 and the moving part 53, and a limiting structure 56 provided on the moving part 53 and the brake base 51.

In one or more embodiments of this disclosure, the braking device 5 controls the connection/disconnection of the electromagnet 52 through the control circuit board 6 to drive the friction block 54 to move thereby the braking the rotor 2. Specifically, when the rotor 2 needs to be braked, the control circuit board 6 controls the electromagnet 52 to be connected to an power supply, at which time the electromagnet 52 generates a magnetic field, exerts magnetic force on the moving part 53, causes the moving part 53 to move, pushes the friction block 54 to move, brings the friction block 54 into contact with the rotor 2, and brakes the rotor. When the rotor 2 needs to rotate, the control circuit board 6 disconnects the electromagnet 52 from the power supply, causing the electromagnet 52 to lose power and the magnetic field, at which time the moving part 53 is not affected by magnetic force but is subjected to a resetting force of the reset member 55. The resetting force of the reset member 55 pushes the moving part 53 to move, and the moving part 53 drives the friction block 54 to perform reset movement and separates the friction block 54 from the moving block 53. In this case, the rotor 2 can perform normal rotational movement. The fire extinguishing device may be provided with two power supply working modes: connection to mains power or direct current. The fire extinguishing device may be further provided with a storage battery and a power transformer, and the connected mains power may be transformed by the transformer for use as a power supply for the motor.

Figure 4:
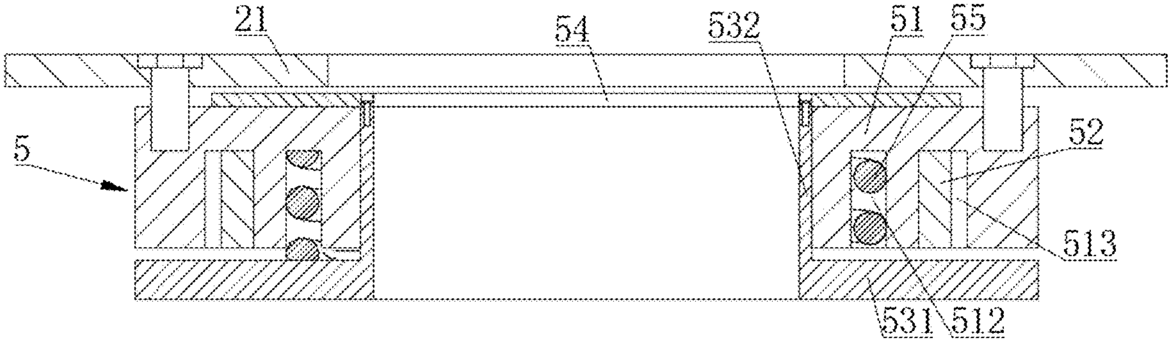
FIG. 4 is a cross-sectional view of a braking device taken along B-B in FIG. 3.
Figure 5:
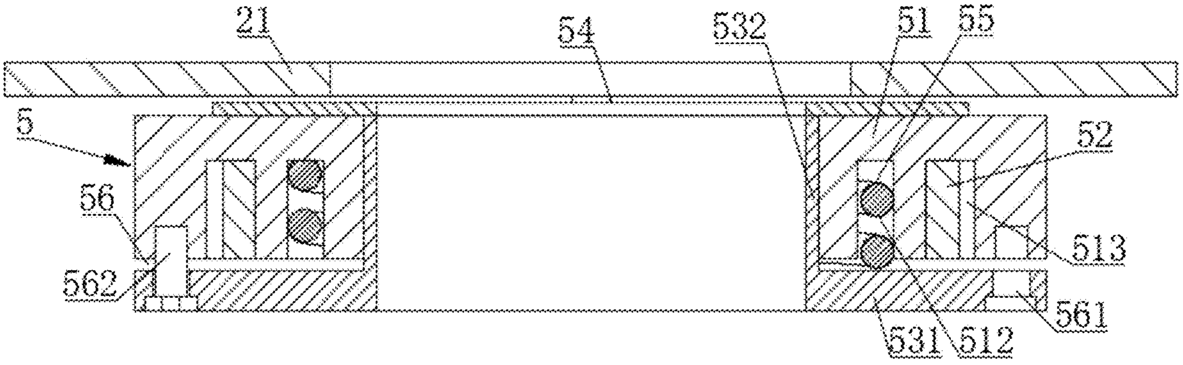
FIG. 5 is a cross-sectional view of a braking device taken along C-C in FIG. 3.

Referring to FIGS. 3 to 5, in one or more embodiments of this disclosure, the brake base 51 is provided with a central through hole 511 corresponding to the stator 1, the brake base 51 is provided with a first annular groove 512 and a second annular groove 513 arranged concentrically with the central through hole 511, a diameter of the first annular groove 512 is smaller than that of the second annular groove 513, the reset member 55 is installed in the first annular groove 512, and the electromagnet 52 is installed in the second annular groove 513. A diameter of the central through hole 511 is larger than that of the stator 1. The reset member 55 may be a spring, where one end of the spring contacts a groove bottom of the first annular groove 512 and the other end abuts against a moving plate, and the moving plate may be made of a magnetic material.

In one or more embodiments of this disclosure, a diameter of the central through hole 511 is limited such that the brake base 51 can be installed on the end cover 21, ensuring the brake base 51 can rotate synchronously with the end cover 21. Concentric arrangement of the central through hole 511, the first annular groove 512, and the second annular groove 513 enables the electromagnet 52 and the reset member 55 to uniformly apply force to the moving part 53.

Referring to FIGS. 3 to 5, in one or more embodiments of this disclosure, the moving part 53 includes a moving plate 531 and a moving sleeve 532 provided on the moving plate 531 and located in the central through hole 511, and an inner size of the moving sleeve 532 is not smaller than a size of the stator. The moving plate 531 is configured to cooperate with the electromagnet 52 and the reset member 55, enabling the electromagnet 52 and the reset member 55 to control the movement of the friction block 54.

Referring to FIGS. 3 to 5, in one or more embodiments of this disclosure, the friction block 54 is installed on the moving sleeve 532 and located between the end cover 21 and the brake base 511, thereby ensuring that the friction block 54 can move to come into contact with or separate from the rotor 2.

Referring to FIGS. 3 to 5, in one or more embodiments of this disclosure, the limiting structure 56 includes a counterbore 561 provided in the moving plate 531 and a bolt 563 installed in the counterbore 561 and connected to the friction block 54. The moving plate 531 can move on the bolt 562, ensuring that the friction block 54 can move.

Referring to FIGS. 1 to 3, in one or more embodiments of this disclosure, a moving part 22 movably connected to the stator 1 is installed on the end cover 21, and the moving part 22 may be a axle sleeve or a bearing, which can effectively reduce friction during rotation of the stator 1.

Figure 6:
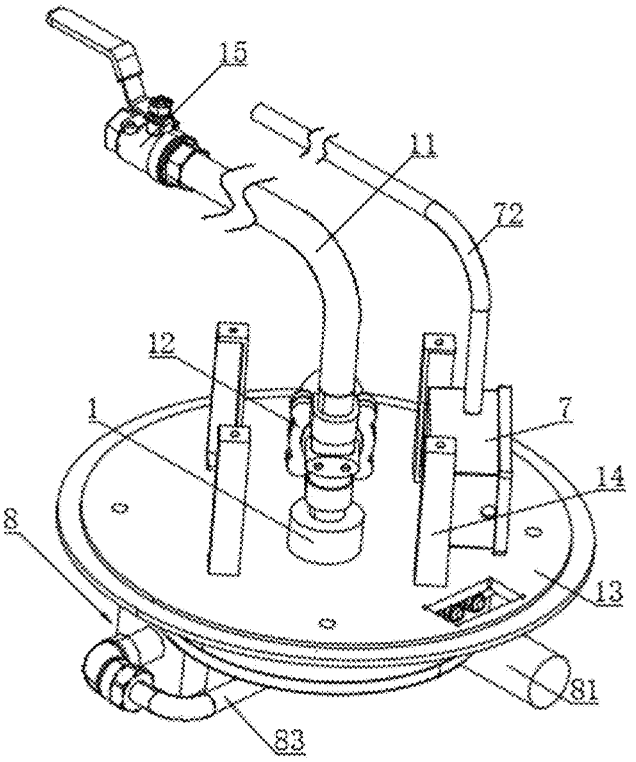
FIG. 6 is a schematic diagram of a fire extinguishing device according to one or more embodiments of this disclosure.
Figure 7:
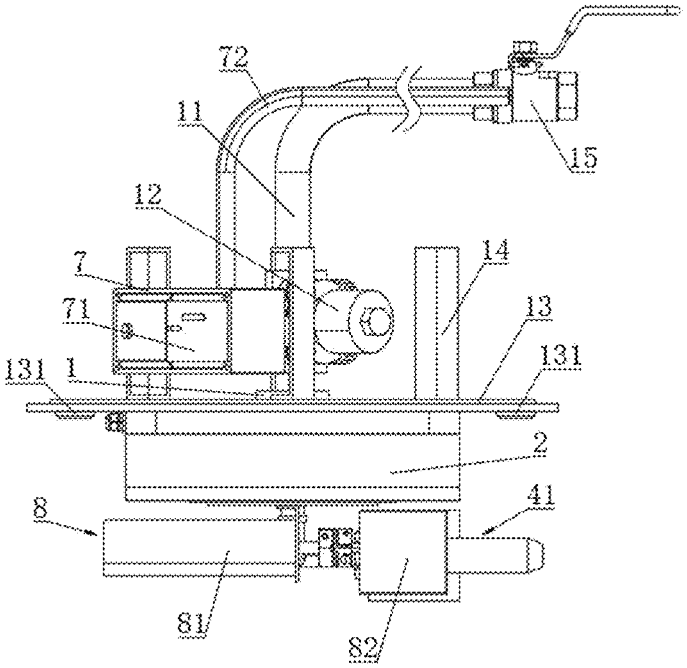
FIG. 7 is a front view of a fire extinguishing device according to one or more embodiments of this disclosure.
Figure 8:
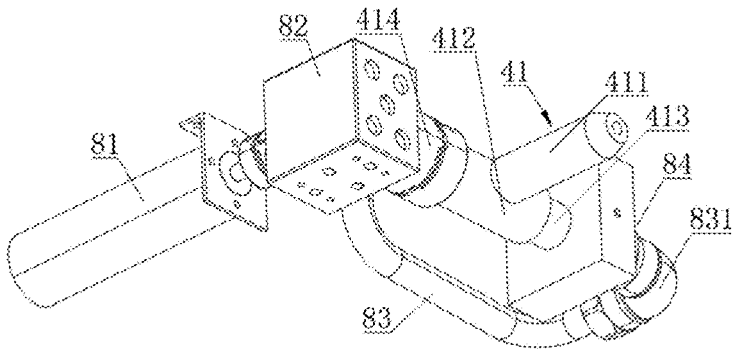
FIG. 8 is a schematic structural diagram of a pivoting mechanism according to one or more embodiments of this disclosure.

Referring to FIGS. 6 to 8, a fire extinguishing device according to one or more embodiments of this disclosure includes a sprinkler 41 rotating synchronously with the rotor 2 and communicating with the medium channel 4, a junction box 7, a firefighting motor 1, and a medium pipe 11 provided on the firefighting motor 1. The sprinkler 41 is configured to spray the fire extinguishing medium flowing in the medium channel 4 and direct the fire extinguishing medium toward a fire source. The medium pipe 11 conveys external fire extinguishing medium into the motor. The sprinkler 41 comprises a nozzle 411 and a pipe 412 in fluid communication with the nozzle 411. One end of the pipe 412 is connected to a transmission mechanism 82 via a shaft coupling 414, and the other end of the pipe 412 is connected to a movable connection structure 84 via a rotating shaft 413. A through-hole is provided in the rotating shaft 413 to communicate the pipe 412 with a connector 831 so as to serve as the inlet pipe for the fire extinguishing medium to enter the nozzle 411.

Referring to FIGS. 6 to 8, in one or more embodiments of this disclosure, the fire extinguishing device further includes a pivoting mechanism 8 installed on the motor 1. A central controller 71 connected to the control circuit board 6 is installed in the junction box 7, and a solenoid valve 12 connected to the central controller 71 is installed on the medium pipe 11. The pivoting mechanism 8 is configured to drive the sprinkler 41 to rotate, adjusting an angle between the nozzle 411 and the ground, enable the nozzle 411 to face a fire source, spray the fire extinguishing medium toward the fire source, and perform firefighting operations. The central controller 71 connects the solenoid valve 12 and the control circuit board 6 to transmit signals. The solenoid valve 12 controls a flow rate of the fire extinguishing medium. The central controller 71 can be, for example, a commonly used PLC (Programmable Logic Controller) and DCS (Distributed Control System) etc. It may be used to monitor sensor data such as temperature, pressure, flow rate, etc., and to control actuators (such as motors and valves), ensuring that the production process operates according to the preset logic.

Referring to FIGS. 6 to 8, in one or more embodiments of this disclosure, when the rotor 2 drives the sprinkler 41 to rotate, a motion trajectory of the nozzle 411 forms a first plane, and when the pivoting mechanism 8 drives the sprinkler 41 to pivot, a second plane is formed by a motion trajectory of the nozzle 411. The second plane is perpendicular to the first plane. The planes formed by the two trajectories may increase a rotation range of the sprinkler 41. In other words, that the rotor 2 drives the sprinkler 41 to rotate in the first plane and the pivoting mechanism 8 drives the sprinkler 41 to rotate in the second plane may ensure that the sprinkler 41 faces a fire source of a fire and perform extinguishing operation.

Referring to FIGS. 6 to 8, in one or more embodiments of this disclosure, the pivoting mechanism 8 includes an adjustment power source 81 installed on the support frame 80, a transmission mechanism 82 connected to the adjustment power source 81 and the sprinkler 41, and a connecting piece 83 movably connected to the stator 1 and the sprinkler 41, and a sensing unit 131 for sensing a fire installed at a bottom of a fixing piece 13. The transmission mechanism is fixed to the rotor 2 such that when the rotor 2 rotates, it can drive the adjustment power source 81, the transmission mechanism 82, and the sprinkler 41 to rotate along. The adjustment power source 81 can be a motor serving as a power source for rotation of the sprinkler 41, and the transmission mechanism 82 can transmit power source output from the adjustment power source 81 to rotate the sprinkler 41.

In one or more embodiments of this disclosure, a connecting piece 83 connects the stator 1 and the sprinkler 41, and the connecting piece 83 can be a connection hose. Both ends of the connecting piece 83 may adopt a movable connection structure 84 to connect the stator 1 and the sprinkler 41.

The transmission mechanism 82 can be a gear transmission, a belt transmission, a gear reversing box, or the like. The sensing unit 131 can be one or a combination of a smoke sensor, a temperature sensor, or a fire sensor which adopts an infrared or ultraviolet composite detection method to detect fire signals. The central controller 71 issues instructions upon receiving fire signals, and the instructions triggers actions of the fire extinguisher. One path of signals connects motor power, the fire extinguisher performs scanning work according to fire signals with signal feedback, and the feedback signal is used to adjust the angle and working state of the fire extinguisher. Another path of signals accesses a fire alarm console, and the fire alarm console has PC and APP data synchronization functions for remote control. After a fire source is extinguished, the sensing unit 804 outputs a signal through the central controller to close the solenoid valve, stop water outflow, stop alarm signals, reset the fire extinguisher, and end the entire firefighting work.

Referring to FIGS. 6 to 8, in one or more embodiments of this disclosure, a fixing piece 13 is installed on the stator 1, and a fixing bracket 14 is installed on a top of the fixing piece 13. This disclosure provides the fixing piece 13 and the fixing bracket 14 to fixedly install the stator on a mounting wall as one of the instances.

To remotely know a state of the fire extinguishing device, a communication module can also be installed on the fire extinguishing device for transmission to a console via the communication module, achieving synchronous display of data on a PC (personal computer) or an APP (application). The communication technology of the communication module is conventional technology on the market and is not described in detail here.

Referring to FIGS. 1 to 8, a working principle of one or more embodiments of this disclosure is as follows.

When a fire occurs, the sensing unit 131 senses a fire and sends a fire signal to the central controller 71 which transmits a signal to the control circuit board 6, and the control circuit board 6 controls the rotor 2 to start rotating. The rotor 2 drives the sprinkler 41 to rotate via the support frame 80, and after the sprinkler 41 rotates to a specified orientation, a signal is transmitted via the central controller 71, causing the control circuit board 6 to control startup of the adjustment power source 81. The adjustment power source 81 drives the sprinkler 41 to rotate through the transmission mechanism 82, directing the nozzle 411 toward the fire, then a signal is transmitted through the central controller to control opening of the solenoid valve 12, and the fire extinguishing medium sequentially passes through the medium pipe 11, the medium channel 4, and the nozzle 411, and is finally sprayed from the nozzle 411 to extinguish the fire. A manual valve 15 may also be installed on the medium pipe 11 to cut off the medium flow during maintenance of the fire extinguishing device.

Figure 9:
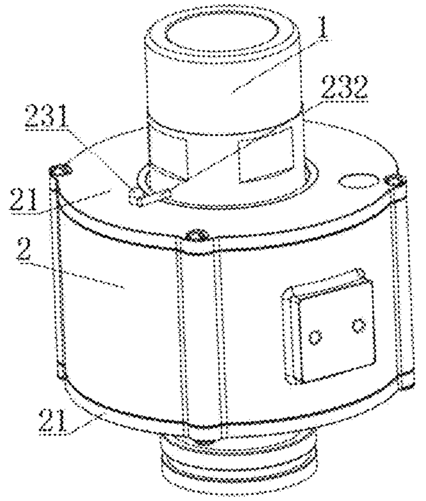
FIG. 9 is a schematic structural diagram of another firefighting motor according to one or more embodiments of this disclosure.

Referring to FIG. 9, a schematic structural diagram of another firefighting motor according to one or more embodiments is disclosed. One of the differences between this motor and the others is that a rotation limiting structure for limiting a rotation angle of the rotor 2 is provided on the rotor 2 and the stator 1, and the rotation limiting structure includes a limiting protrusion 231 provided on the stator 1 and a mating protrusion 232 provided on the rotor 2 and corresponding to the limiting protrusion 231.

A rotation angle of the rotor 2 is limited by the limiting protrusion 231 and the mating protrusion 232, ensuring that the rotor 2 can only perform forward and reverse 360° reciprocating rotation, and ensuring that the rotor 2 does not over-rotate.

Figure 10:
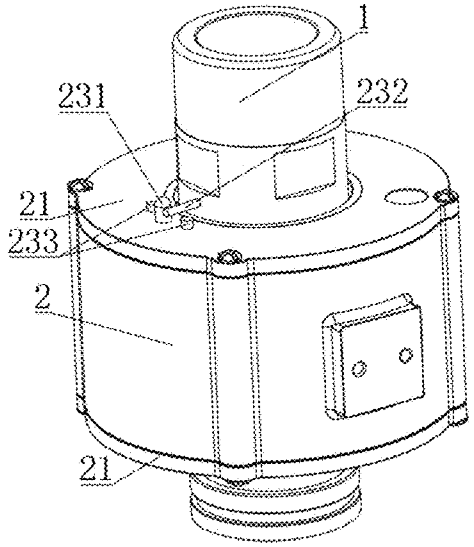
FIG. 10 is a schematic structural diagram of yet another firefighting motor according to one or more embodiments of this disclosure.
Figure 11:
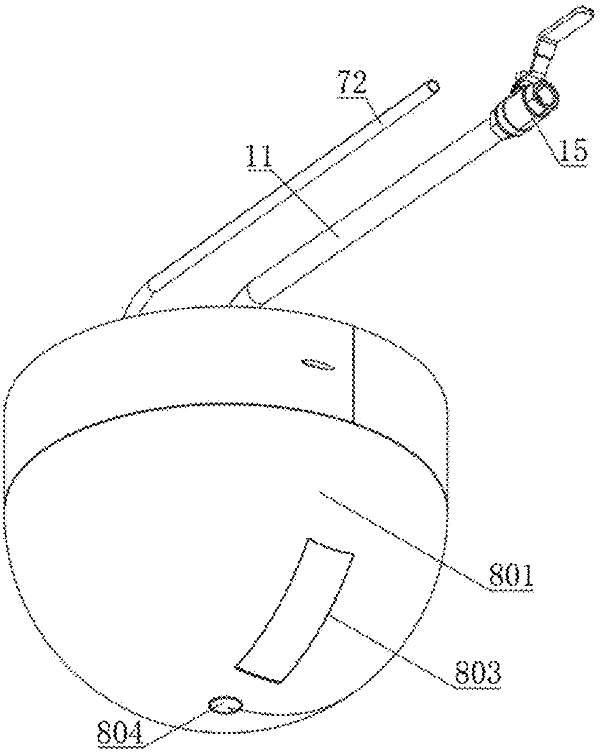
FIG. 11 is a schematic structural diagram of another fire extinguishing device according to one or more embodiments of this disclosure.
Figure 12:
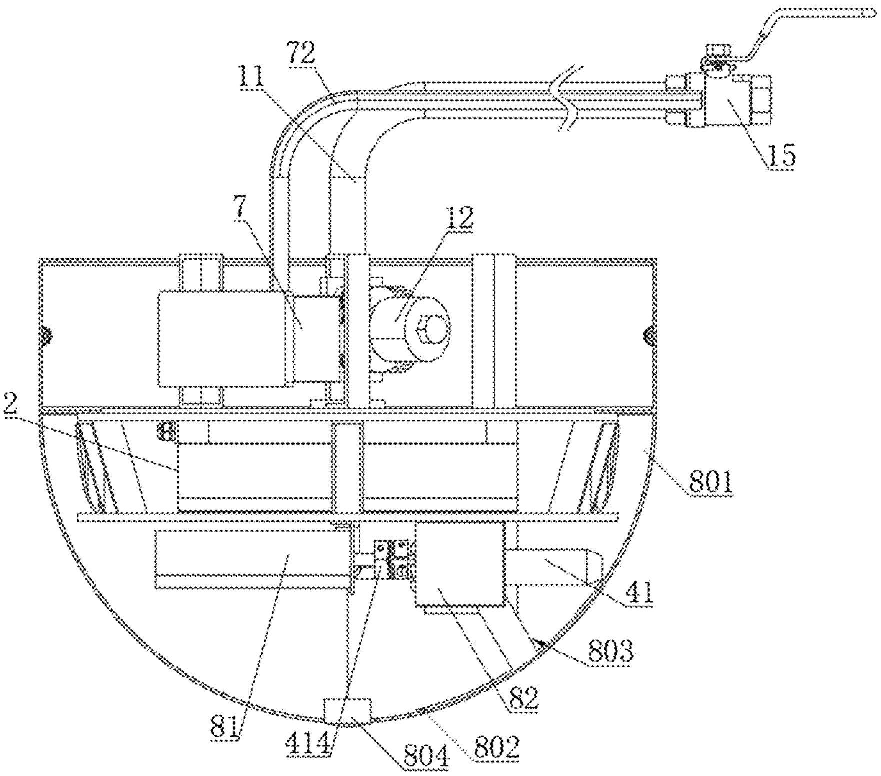
FIG. 12 is a schematic internal structural diagram of the fire extinguishing device of FIG. 11.
Figure 13:
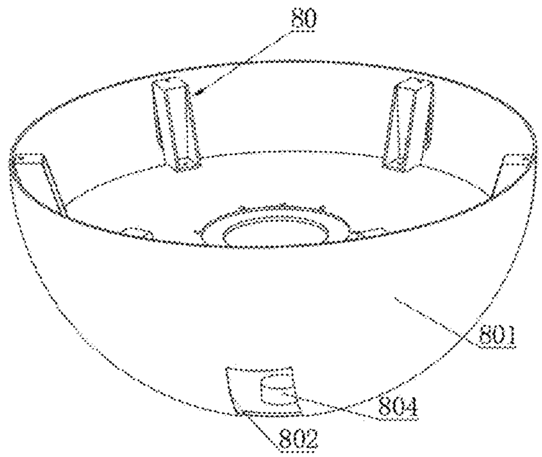
FIG. 13 is a schematic structural diagram showing a support frame and a protective cover of the fire extinguishing device of FIG. 11.
Figure 14:
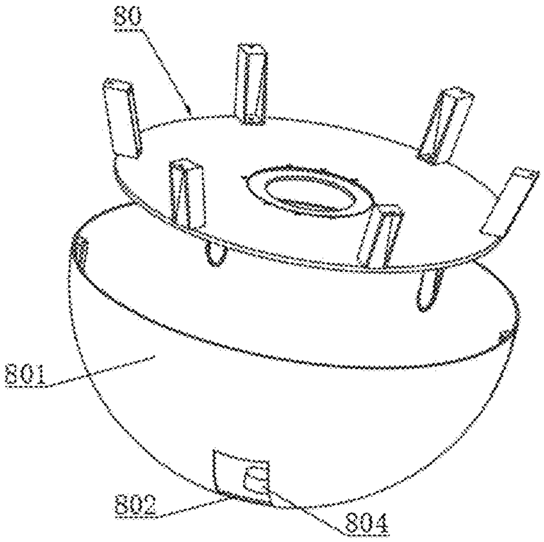
FIG. 14 is an exploded schematic structural diagram showing a support frame and a protective cover of the fire extinguishing device of FIG. 11.
Figure 15:
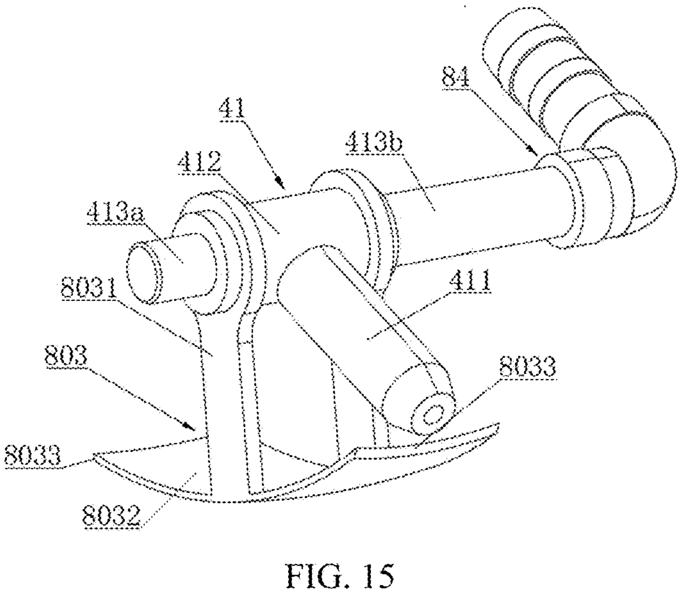
FIG. 15 is a schematic structural diagram showing a sprinkler and a blocking piece according to one or more embodiments of this disclosure.

Referring to FIG. 10, a schematic structural diagram of yet another firefighting motor according to one or more embodiments is disclosed. One of the differences between this motor and the others is that the rotation limitation structure 23 further includes two proximity switches 233, the two proximity switches 233 being installed on the end cover 21 and symmetrically distributed with respect to a connection line between a center point of the stator 1 and the limiting protrusion 231. During rotation of the rotor 2, the proximity switches 233 are driven to move, and the proximity switches 233 sense contact with and passage of the mating protrusion 232.

The proximity switches 233 is configured to emit a signal before hard contact between the mating protrusion 232 on the rotor 2 and the limiting protrusion 231, provide a signal for the braking device 5 to stop the rotor 2, reduce impact force generated by collision between the limiting protrusion 231 and the mating protrusion 232, and extend service life of the stator 1 and the rotor 2.

Referring to FIGS. 11 to 15, a schematic structural diagram of another fire extinguishing device according to one or more embodiments is disclosed. One of the differences between the device and the others is that a protective cover 801 is installed on the support frame 80, a spray hole 802 is provided in the protective cover 801, a blocking piece 803 corresponding to the spray hole 802 is installed on the sprinkler 41 and has a size sufficient for blocking the whole of the spray hole 802. When the sprinkler 41 undergoes pivoting adjustment, the blocking piece 803 is driven to rotate synchronously. A sensor 804 for fire detection may be installed at the bottom of the protective cover 801. The sensor 804 may be one or a combination of a smoke sensor, a temperature sensor, or a fire sensor. The sensor may detect fire signals using infrared or ultraviolet composite detection methods.

The protective cover 801 is configured to protect the motor and the sprinkler 41 and prevent direct impact by external substances on the motor or the sprinkler 41. The spray hole 802 ensures that the fire extinguishing medium can be sprayed from the spray hole 802 for fire extinguishing. The blocking piece 803 blocks dust and other impurities during non-operation of the sprinkler 41, and prevents a large amount of dust from directly contacting the motor and affecting the service life of the motor.

Referring to FIGS. 11 to 15, in one or more embodiments of this disclosure, the blocking piece 803 includes a connection plate 8031 fixedly installed on the sprinkler 41 by welding or the like, and an arc-shaped baffle 8032 installed on the connection plate 8031, and the arc-shaped baffle 8032 corresponds to the spray hole 802.

The connection plate 8031 may be fixedly installed on the sprinkler 41 so that when the sprinkler 41 rotates, it can synchronously drive the arc-shaped baffle 8032 to rotate. The arc-shaped baffle 8032 blocks the spray hole 41, prevents dust from entering from the spray hole 41, and reduces internal dust. A leading end of the arc-shaped baffle 8032 may be provided with a bevel, that is, an end of the arc-shaped baffle 8032 away from the sprinkler 41 is provided with a bevel 8033, and the bevel 8033 can effectively prevent interference between the arc-shaped baffle 8032 and the protective cover 801 during rotation. That is, when the fire extinguishing medium needs to be sprayed to extinguish a fire, the sprinkler 41 rotates, at which time it drives the arc-shaped baffle 8032 to rotate synchronously and an end of the arc-shaped baffle 8032 away from the sprinkler 41 is a moving leading end. As the sprinkler 41 and the arc-shaped baffle 8032 swing toward a leading direction, the spray hole 802 opens, and the nozzle 411 moves to the spray hole 802, thereby enabling the spray of fire-extinguishing medium toward the exterior of the protective cover 801. Correspondingly, when there is no need to spray the fire-extinguishing medium, the sprinkler 41 and the arc-shaped baffle 8032 swing toward the backward direction opposite to the leading direction until the arc-shaped baffle 8032 block the entirety of the spray hole 802, thereby preventing external dust and the like from entering the interior of the protective cover 801.

Referring to FIGS. 11 to 15, in one or more embodiments, an orthographic projection of the sprinkler 41 on the second plane and an orthographic projection of the connection plate 8031 on the second plane form an included angle with an opening facing the arc-shaped baffle 8032. When the sprinkler 41 rotates to any angle, the orthographic projection of the sprinkler on the second plane does not coincide with the orthographic projection of the connection plate on the second plane, thereby ensuring that when the sprinkler 41 sprays the fire extinguishing medium, the fire extinguishing medium does not hit the arc-shaped baffle 8032, and ensuring that the fire extinguishing medium can be sprayed onto a fire source for extinguishing.

Figure 16:
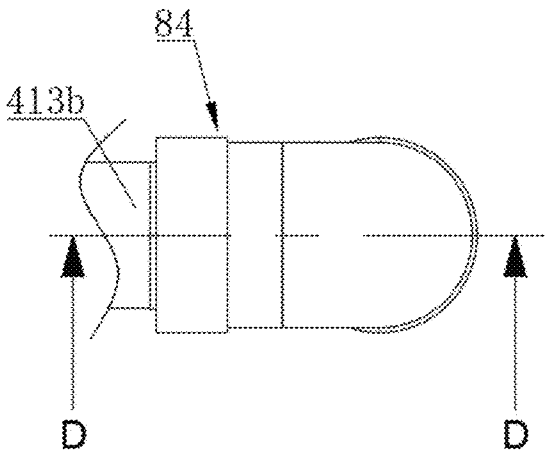
FIG. 16 is a schematic connection diagram of a second rotating shaft and a connector according to one or more embodiments of this disclosure.
Figure 17:
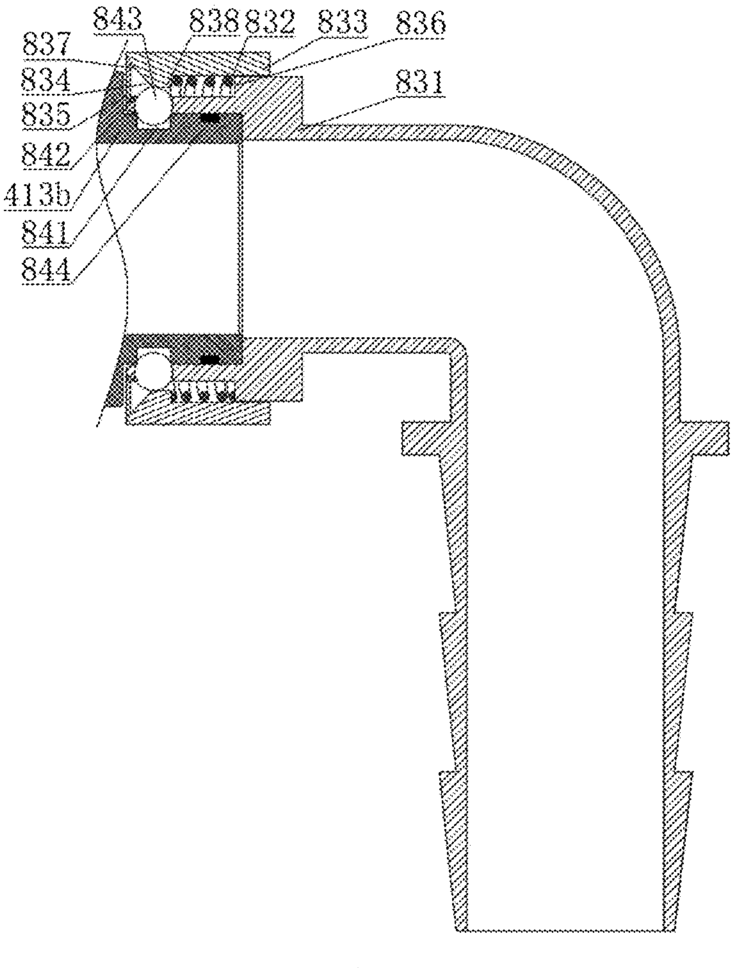
FIG. 17 is a cross-sectional partial view along D-D in FIG. 16.

Referring to FIG. 16 and FIG. 17, in one or more embodiments of the disclosure, a movable connection structure 84 is used to connect the stator 1 with the connecting piece 83 or connect the sprinkler 41 with the connecting piece 83. When the movable connection structure 84 is used to connect the sprinkler 41 with the connecting piece 83, the connecting piece 83 may comprise a connector 831, a steel ball 843, a movable sleeve 833, and an elastic member 832, and correspondingly, the nozzle 411 of the sprinkle 41 is provided with a tubular rotating shaft 413*b*. The connector 831 is movably connected to the tubular rotating shaft 413*b* of the nozzle 411 to deliver the fire extinguishing medium from the medium channel 4 to the nozzle 411. For example, the elastic member 832 may be a compression spring.

One end portion of the connector 831 may be provided with an axially extending limiting groove 834 and an outer annular groove 842 radially extending from the limiting groove 834. The limiting groove 834 has a first limiting protrusion 835 and a second limiting protrusion 836 both extending radially outward. The first limiting protrusion 835 may be a part extending from the connector 831 or a separate component fixedly mounted to the connector 831.

The steel ball 843 is confined within the outer annular groove 842 and is movable within a predetermined radial range.

The movable sleeve 833 is sleeved on an outer periphery of the connector 831 and is provided with an end inclined surface 837 and a radially inward protrusion 838 extending from the end inclined surface. The end inclined surface 837 and the radially inward protrusion 838 are configured such that, when the movable sleeve 833 moves toward the first limiting protrusion 834, the end inclined surface 837 pushes the steel ball 843 to move radially inward within the outer annular groove 842, and when the movable sleeve 833 moves to abut against the first limiting protrusion 835, the steel ball 843 abuts against the radially inward protrusion 838.

The elastic member 832 is sleeved on the outer periphery of the connector 831. One end face of the elastic member 832 abuts against the radially inward protrusion 838 of the movable sleeve 833, and another end face abuts against the second limiting protrusion 836 of the connector 831.

The tubular rotating shaft 413*b* of the nozzle 411 has an outer annular groove 841 which is configured such that, when the movable sleeve 833 moves to abut against the first limiting protrusion 835, the steel ball 843 is partially pressed into the outer annular groove 841 by the radially inward protrusion 838, thereby fixedly connecting the tubular rotating shaft 413*b* and the connector 831 to each other.

In one or more embodiments of the disclosure, a rubber sealing ring 844 may be disposed between the tubular rotating shaft 413*b* and the connector 831 to form a seal therebetween to prevent leakage of a fire extinguishing medium.

The above are illustrations of this disclosure and not limitations of this application, and any solutions obtained by simple transformation of this disclosure fall within the protection scope of this application.

What is claimed is:

1. A fire extinguishing device comprising:
- a firefighting motor comprising:
  - a stator;
  - a rotor disposed outside the stator to rotate around the stator; and
  - a coil winding disposed on the stator or the rotor,
  - wherein the stator includes a medium channel for a fire extinguishing medium to flow through, and
  - wherein the medium channel extends through the stator in a direction substantially parallel to a rotational axis of the rotor;
- a nozzle that rotates synchronously with the rotor and is in fluid communication with the medium channel;
- a connecting piece that connects the medium channel with the nozzle and establishes fluid communication therebetween; and
- a pivoting mechanism configured to drive the nozzle to pivot and installed on the firefighting motor to rotate together with the firefighting motor,
- wherein, when the rotor drives the nozzle to rotate, a motion trajectory of the nozzle forms a first plane,
- wherein, when the pivoting mechanism drives the nozzle to pivot, a motion trajectory of the nozzle forms a second plane perpendicular to the first plane, and
- wherein the pivoting mechanism comprises:
  - a support frame installed on the rotor;
  - an adjustment power source installed on the support frame; and
  - a transmission mechanism connected to the adjustment power source and the nozzle and configured to transmit power output from the adjustment power source to the nozzle to drive the nozzle to pivot.

2. The fire extinguishing device according to claim 1, further comprising:
- a protective cover installed on the support frame and comprising a spray hole for the fire extinguishing medium; and
- a blocking piece connected to the nozzle and configured to pivot synchronously with the nozzle.

3. The fire extinguishing device according to claim 2, further comprising a sensor for sensing a fire installed on the protective cover.

4. The fire extinguishing device according to claim 1, further comprising a medium pipe in fluid communication with the medium channel of the stator.

5. The fire extinguishing device according to claim 4, further comprising a solenoid valve installed on the medium pipe for controlling a flow of fire extinguishing medium through the medium pipe.

6. The fire extinguishing device according to claim 1, wherein the firefighting motor further comprises:
- an end cover movably connected to the stator at each of two axial ends of the rotor; and
- a braking device disposed on at least one end cover and configured to operationally lock the rotor from rotation.

7. The fire extinguishing device according to claim 6, wherein the braking device is an electromagnetic braking device.

8. A fire extinguishing device comprising:
a firefighting motor comprising:
a stator;
a rotor disposed outside the stator to rotate around the stator; and
a coil winding disposed on the stator or the rotor,
wherein the stator includes a medium channel for a fire extinguishing medium to flow through, and
wherein the medium channel extends through the stator in a direction substantially parallel to a rotational axis of the rotor;
a nozzle that rotates synchronously with the rotor and is in fluid communication with the medium channel; and
a connecting piece that connects the medium channel with the nozzle and establishes fluid communication therebetween,
wherein the connecting piece comprises:
a connector, an end portion of which includes an axially extending limiting groove and an outer annular groove radially extending from the limiting groove, the limiting groove having a first limiting protrusion and a second limiting protrusion both extending radially outward;
a steel ball confined within the outer annular groove and movable within a predetermined radial range;
a movable sleeve sleeved on an outer periphery of the connector and comprising an end inclined surface and a radially inward protrusion extending from the end inclined surface, wherein the end inclined surface and the radially inward protrusion are configured such that, when the movable sleeve moves toward the first limiting protrusion, the end inclined surface pushes the steel ball to move radially inward within the outer annular groove, and when the movable sleeve moves to abut against the first limiting protrusion, the steel ball abuts against the radially inward protrusion; and
an elastic member sleeved on the outer periphery of the connector, wherein one end face of the elastic member abuts against the radially inward protrusion of the movable sleeve, and another end face abuts against the second limiting protrusion of the connector.

9. The fire extinguishing device according to claim 8,
wherein the nozzle comprises a tubular rotating shaft,
wherein the connector is movably connected to the tubular rotating shaft of the nozzle to deliver the fire extinguishing medium from the medium channel to the nozzle, and
wherein the tubular rotating shaft of the nozzle has an outer annular groove, the outer annular groove being configured such that, when the movable sleeve moves to abut against the first limiting protrusion, the steel ball is partially pressed into the outer annular groove by the radially inward protrusion, thereby fixedly connecting the tubular rotating shaft and the connector to each other.

10. The fire extinguishing device according to claim 8, further comprising a rubber sealing ring disposed between the tubular rotating shaft and the connector to form a seal therebetween to prevent leakage of a fire extinguishing medium.

* * * * *